United States Patent [19]

Clemens

[11] 3,909,517

[45]*Sept. 30, 1975

[54] DISC RECORDS WITH GROOVE BOTTOM DEPTH VARIATIONS

[75] Inventor: Jon Kaufmann Clemens, Princeton, N.J.

[73] Assignee: RCA Corporation, New York, N.Y.

[ * ] Notice: The portion of the term of this patent subsequent to Oct. 15, 1991, has been disclaimed.

[22] Filed: Dec. 3, 1973

[21] Appl. No.: 420,782

Related U.S. Application Data

[62] Division of Ser. No. 126,772, March 22, 1971, Pat. No. 3,842,194.

[52] U.S. Cl...178/6.6 A; 179/100.1 B; 179/100.4 M

[51] Int. Cl.$^2$.. G11B 11/00; G11B 3/72; H04N 5/76

[58] Field of Search............ 179/100.1 B, 100.4 ST, 179/100.4 M, 100.4 R; 178/6.6 A

[56] References Cited

UNITED STATES PATENTS

| | | | |
|---|---|---|---|
| 3,652,809 | 3/1972 | Dickopp et al. | 179/100.4 R |
| 3,798,388 | 3/1974 | Dickopp | 179/100.4 R |

FOREIGN PATENTS OR APPLICATIONS

| | | | |
|---|---|---|---|
| 153,300 | 2/1922 | United Kingdom | 179/100.1 B |
| 1,181,275 | 11/1964 | Germany | 179/100.1 B |

*Primary Examiner*—Bernard Konick
*Assistant Examiner*—Stewart Levy
*Attorney, Agent, or Firm*—Eugene M. Whitacres; William H. Meagher

[57] ABSTRACT

An information record employs a storage medium comprising a metallized base material having a dielectric coating thereon. The dimensions of an information track contained in a groove in the storage medium vary in accordance with recorded information pursuant to an information-representative pattern of relatively raised and depressed areas, the former constituting undisturbed regions of the groove bottom. The information track may comprise (1) an AM carrier pattern wherein a carrier frequency amplitude modulated by the video signals is represented by successive pairs of regions, a first region of each pair having the relative widths of a central depressed area and adjoining raised areas determined by video signal amplitude, and the succeeding region of each pair having the relative widths of a central raised area and adjoining depressed areas complementarily determined; or (2) a FM carrier pattern, wherein depressed areas extending across the width of the groove bottom alternate with raised areas extending across the width of the groove bottom, and the spacing between successive areas of the same type varies with video signal amplitude. The capacitance between an electrode in a pickup tracking in said groove and the metallized surface of the storage medium varies in accordance with the modulated information track as the pickup device scans the recording medium. Circuitry responding to said capacitance variations provides an output signal corresponding to the information recorded. One application of such a system is to record, on both sides of a disc, video information which can be reproduced in form of a video display.

2 Claims, 28 Drawing Figures

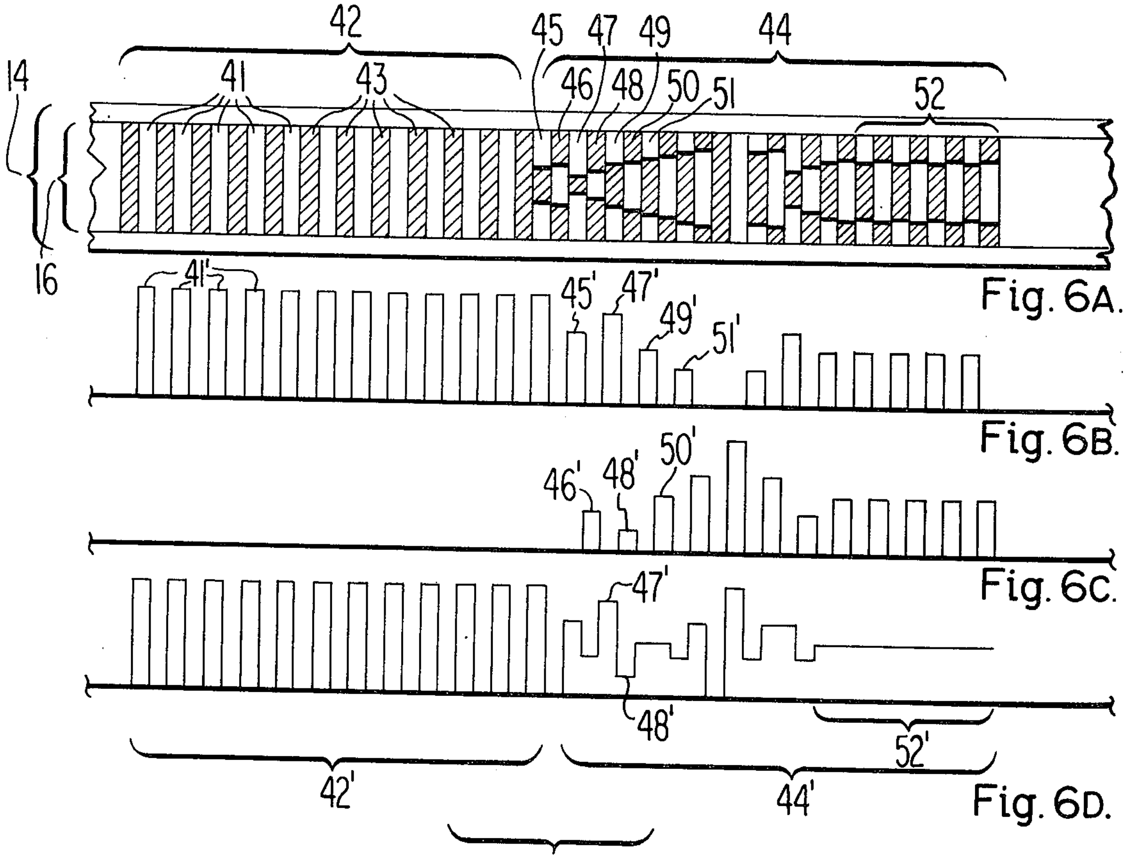
Fig. 6A. Fig. 6B. Fig. 6C. Fig. 6D.
Fig. 6.
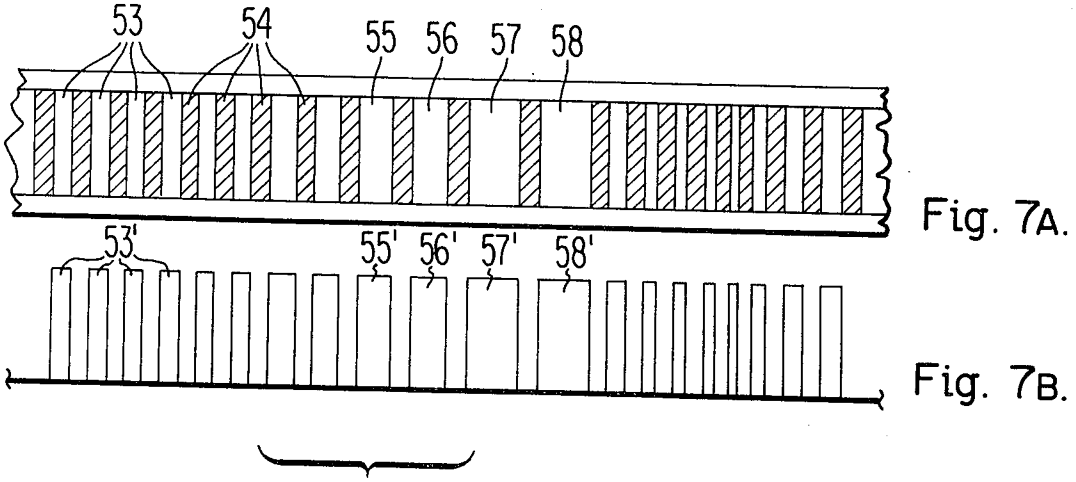
Fig. 7A. Fig. 7B.
Fig. 7.

DISC RECORDS WITH GROOVE BOTTOM DEPTH VARIATIONS

This application is a division of my copending application, Ser. No. 126,772, filed Mar. 22, 1971 now U.S. Pat. No. 3,842,194.

The present invention relates generally to novel information records for use in a recording/playback system permitting, for example, relatively inexpensive mass replication and simple playback of recordings of video signals for display in monochrome or color.

A variety of approaches to information recording exist in the prior art. A common phonograph system using a piezo-electric transducer is an example of an electromechanical system which has proven successful for limited bandwidth applications (for example, audio recordings).

Magnetic tape recording using a helical scan recording and playback mechanism has extended the bandwidth capabilities of prior linear scan magnetic tape system so that video frequency recording is possible using magnetic tape as the recording medium.

Video signals have been effectively recorded on a phonograph record using bandwidth conversion techniques to allow the recording of lower frequency signals on a phonograph record. The recorded low frequency signals are detected and converted by means of a storage tube into video frequency signals for television display.

These and other similar systems suffer from one or more practical deficiencies, such as lack of adequate bandwidth capabilities for video frequencies, insufficiently long playback time, high cost of mass replication or high cost of playback apparatus, et al. Magnetic tape, for example, remains a relatively costly medium when employed for video recording. The necessary bandwidth conversion equipment required when using a low bandwidth phonograph record for video recordings remains too expensive for the general consumer public.

A recently developed video disc recording system utilizes a thin flexible disc and electromechanically records and retrieves signals from this video record. Playback requires revolving the record at a speed of the order of 1,500 rpm, using a central hub drive, with the record rotating on an air cushion above a stationary platform. The resulting output signals are of sufficient bandwidth to provide a black and white television display. Although disc replication in such a system is relatively inexpensive, the playback time is limited by the relatively fast rotation of the record, and by the fact that only one side of the disc is recorded.

In a copending application of Thomas O. Stanley, Ser. No. 126,678, now U.S. Pat. No. 3,783,196 a video disc playback system is described wherein geometric variations in the bottom of a spiral groove on a disc record are relied upon to establish, in cooperation with a tracking stylus incorporating a conductive electrode, capacitance variations representative of video signals as the disc is rotated by a supporting turntable.

An information record, in accordance with a preferred disc format of my aforesaid application Ser. No. 126,772, also incorporates geometric variations in the bottom of a spiral groove in the disc surface, which upon playback cooperate with a tracking stylus electrode to establish information-representative capacitance variations. In accordance with the principles of the invention of my aforesaid application, however, the grooved disc surface comprises conductive material covered with a thin coating of dielectric material. The tracking stylus and groove shapes are preferably sufficiently correlated so that, during playback, a surface of the conductive stylus electrode may be separated from the dimension-varying conductive material in the bottom of the groove by essentially only the thin dielectric coating thereon. A desirably linear relationship between the information-representative dimension variations in the groove bottom and the capacitance presented between the stylus electrode and the disc's conductive surface results when relative motion between the stylus and groove occurs. Circuitry responding to such capacitance variations may readily reconstitute the recorded information in electrical signal form with an acceptance signal-to-noise ratio. The existence of the coated conductive surface on the disc permits the presence of different recordings on both sides of the disc, with playback of one disc side substantially unaffected by the information recorded on the opposite disc side.

Applying the principles of the invention of my aforesaid application in the above-discussed disc format, to wideband information storage, one may provide, for example, a video recording/playback system wherein the relatively inexpensive mass replication techniques associated with conventional phonograph record stamping may be used to advantage (supplemented by appropriate metallizing and coating techniques), wherein the record medium base material may comprise a relatively inexpensive thermoplastic material, such as vinyl, and wherein the playback apparatus may readily adapt turntable drive techniques and record changing techniques associated with conventional phonographs. Moreover, in such application one may obtain adequate bandwidth for monochrome or color display with a disc rotation speed (e.g., 360 rpm) significantly less than that required for the above-mentioned air-cushioned, flexible disc system, with the consequence of a significantly greater playing time for a disc side of the same diameter; of course, the ability, pursuant to the principles of the invention of my aforesaid application, to record on both sides of the disc, provides a further, factor-of-two increase in playing time per record, relative to one-side-only recording system, such as the aforementioned air-cushioned disc system.

In accordance with an illustrative embodiment of the principles of the invention of my aforesaid application, acceptable video displays are obtainable from playback of a disc of vinyl base material, having a conductive layer of a metal, such as aluminum, vapor deposited on its surface to a thickness of the order of 500 Angstrom units (A), and a dielectric coating thereover, of such material as polystyrene, with a thickness comparable to that of the metal layer. For playback at a disc rotation speed of 360 revolutions per minute, the following groove parameters may, illustratively, be employed: groove pitch-1000 grooves per inch, groove width-11 micrometers, total groove depth-5 micrometers. The groove walls may be smoothly curved, with the stylus pickup tip comparably conformed. Illustratively, the stylus pickup comprises a suitably shaped base (formed, e.g., of sapphire) supporting a conductive electrode (formed, e.g., of such material as tantalum, vacuum sputtered on the base) with a groove bottom engaging surface having a dimension in a direction along the groove of approximately 0.3 micrometer, and a dimension in a direction transverse to the groove of approximately 5 micrometers.

Illustratively, the information track in the groove bottom may comprise a suitable information-representative pattern of relatively raised and depressed areas, the former constituting undisturbed regions of the groove bottom, while the latter comprise regions depressed below the normal groove bottom by a distance of the order of 0.4 micrometer. A pattern feasible for use comprises a baseband pattern wherein the video signals are directly represented by the relative widths of a central depressed area and adjoining raised areas in the bottom of the groove.

However, pursuant to the principles of the invention herein claimed, the information track in the groove bottom may, instead, advantageously comprise: (1) an AM carrier pattern wherein a carrier frequency amplitude modulated by the video signals is represented by successive pairs of regions, a first region of each pair having the relative widths of a central depressed area and adjoining raised areas determined by video signal amplitude, and the succeeding region of each pair having the relative widths of a central raised area and adjoining depressed areas complementarily determined; or (2) a FM carrier pattern, wherein depressed areas extending across the width of the groove bottom alternate with raised areas across the width of the groove bottom, and the spacing between successive areas of the same type (e.g., depressed areas) varies with video signal amplitude.

Initial recording of the video information on a master disc, from which replicas may be derived, may be achieved by a variety of techniques including electromechanical cutting and optical scanning. However, a particularly accurate recording technique, that may be advantageously employed involves use of a scanning electron microscope to selectively expose a photoresist-coating in the grooves of a nickel recording master disc, in appropriate response to the information to be recorded, as dictated by the pattern (e.g., baseband, AM or FM) desired. Subsequent steps to derive vinyl replicas may use techniques comparable to those employed in audio record replication. Final preparation of such replicas includes, persuant to previously discussed principles of the present invention, application of the metal and dielectric coatings to the replica surface.

Upon playback of the replica disc, a variety of techniques may be employed to derive signals for display purposes from the capacitance variations exhibited between stylus electrode and the disc's metal surface. Illustratively, the variable capacitance provided thereby may be used to vary the resonance of a tuned circuit excited by an RF oscillator. A suitable detector circuit may convert the resonance changes to an amplitude varying output signal, which may then be processed in a manner appropriate to the modulation pattern employed on the disc to derive, for example, video output signals for application to a video input monitor, or, for another example, modulated RF signals for application to the antenna terminals of a television receiver.

An object of the present invention is to provide a novel information record.

Other objects and advantages of the present invention will be recognized by those skilled in the art upon a reading of the following detailed description and an inspection of the accompanying drawings in which:

FIG. 6A is a top view of a portion of a groove in which information is recorded in the form of an amplitude modulated carrier signal, pursuant to an embodiment of the present invention;

FIG. 6B through 6D are diagrams showing the capacitance variations detected by a pickup stylus which scans over the portion of the groove shown in FIG. 6A,

FIG. 7A is a top view of a groove in which information is recorded in the form of a frequency modulated carrier signal, pursuant to another embodiment of the present invention;

FIG. 7B is a diagram showing the capacitance variations which would be detected by a stylus tracking the portion of the groove shown in FIG. 7A;

Figures 1, 2:
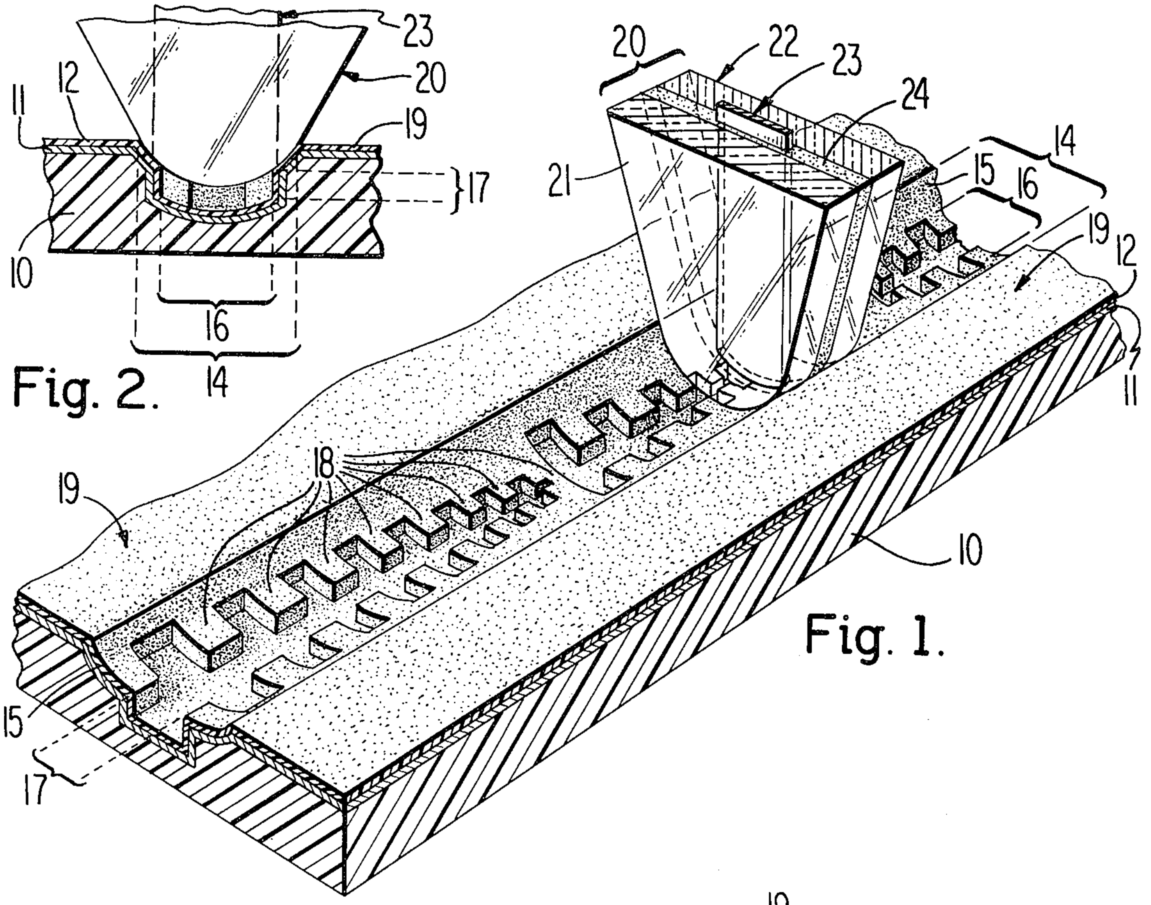
FIG. 1 is a perspective view of a portion of a grooved storage medium and a section of the tip of a pickup stylus tracking in a groove thereof.
FIG. 2 is a cut-away transverse view of the groove of FIG. 1 showing the profile of the groove and the modulation contained therein and also illustrating the placement of the pickup stylus tip.

FIG. 1 illustrates a portion of a storage medium 10 including a groove 14 in which a stylus 20 rides enabling it to track the groove. While storage medium 10 may take the form of a tape or sheet of material, in a preferred format of the present invention storage medium 10 comprises a disc, having an elongated spiral groove contained therein, and, illustratively, fabricated from a thermoplastic material, such as vinyl, as is used in a phonograph record. When this type of disc is used as the storage medium, the playback mechanism may be somewhat similar to a phonograph player, with a turntable used to rotate the disc while stylus 20 is suitably held in a position to track the spiral groove; such a playback mechanism will be described in greater detail subsequently. It is noted that only a section of the very tip of stylus 20 is shown in FIG. 1, which is a greatly enlarged view showing the arrangement of the stylus 20 relative to the groove 14.

Viewing the groove portion of the disc in detail, it is seen that the base material of storage medium 10 has a conducting surface layer 11 which may, illustratively, be vacuum deposited on its surface. This layer may be of a conductive metal such as aluminum, vapor deposited to a thickness of 500 A, for example. A dielectric coating 12 overlays the metallized layer 11. Layer 12 may, illustratively, be of a dielectric material such as polystyrene, also with a 500A thickness.

Looking at the topology of the surface of the disc, FIG. 1 shows a very small portion of the spiral groove 14 illustrating modulation elements 18 in the groove. The modulation system used in the FIG. 1 example is a base band type in which the signal information is recorded directly without the use of a carrier signal. Other modulation systems which may be alternatively employed pursuant to the principles of the present invention will be discussed subsequently. Elements 18 appear as protrusions in a signal information track 16. The elements 18 (formed in a manner later described) provide capacitance variations between the pickup stylus 20 and the metallized layer 11.

As the electrode 23 scans over the modulation elements 18, the area of the metallized layer 11 which is immediately adjacent to the electrode 23 varies in accordance with the recorded signal information. The signal information track 16 covers a substantial amount of the groove area to maximize the difference between maximum and minimum detected capacitance. The remaining area in the groove comprises the groove walls 15 which support stylus 20. The area between successive grooves comprises the land areas 19. It is noted that for the most efficient use of the total disc surface, it is desirable to reduce the land areas to a minimum amount; the relative land area dimensions are exaggerated in FIG. 1 for ease of illustration.

The intended portion of the information track (i.e., between modulation elements 18) is of nearly uniform depth as shown by the depth dimension 17 of the information track 16 in FIG. 1. Pursuant to an illustrative set of track dimensions, the depth 17 of track 16 may be about 0.4 micrometer, the groove depth approximately 5 micrometers, and the groove width approximately 11 micrometers.

The pickup stylus 20 illustrated in FIG. 1 includes first and second dielectric support members 21 and 22, respectively, in which a conductive electrode 23 is embedded. Illustratively, the electrode 23 is approximately 0.3 micrometers in thickness and approximately 5 micrometers in width at the bottom of the stylus at the point where it contacts the groove 14.

Figure 5:
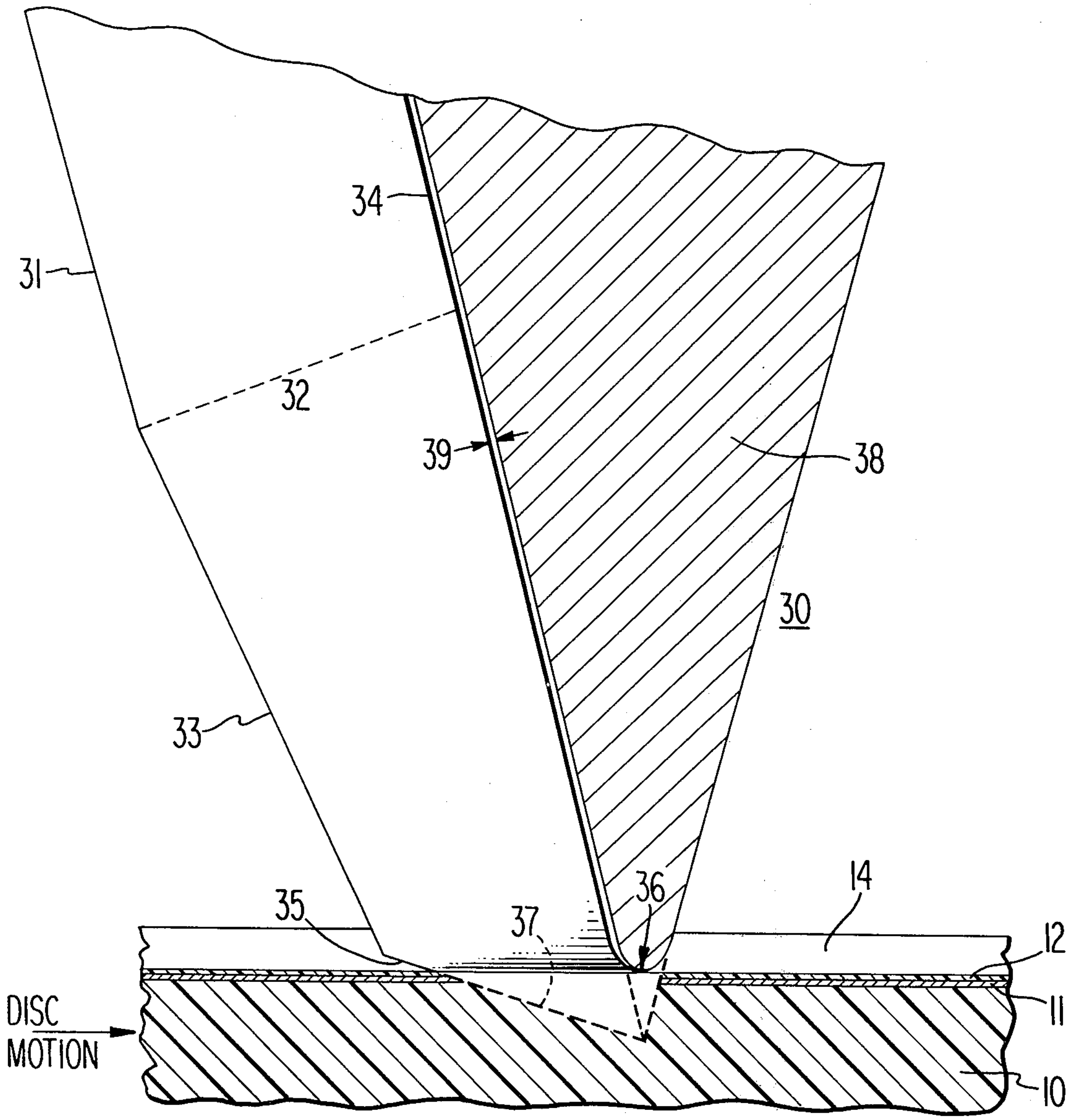
FIG. 5 is a perspective view of a stylus tip in accordance with a modulation of the stylus tip construction illustrated in FIGS. 1 and 2.

The stylus assembly 20 may be fabricated, for example, by a vacuum sputtering a conducting material such as tantalum on a sapphire base 21, to form the electrode 23 thereon. The base material can be masked to provide a suitable electrode profile, and the sputtering process suitably controlled to provide a uniform coating of tantalum of the desired thickness. The second support member 22 may then be bonded to the electrode 23, using, for example, a sputtered glass layer 24 as a bonding agent, to form a sandwich structure in which the conducting electrode is embedded. The stylus assembly may then be lapped in a groove including a fine abrasive material to generally conform the tip of the stylus to the shape of the groove 14. An alternative form for the stylus 20 is shown in FIG. 5 and described in detail subsequently.

FIG. 2 shows an end view of the groove 14 of FIG. 2 and the relative position of the stylus 20 with respect thereto. In FIG. 2, the parts identical to those shown in FIG. 1 are labeled with the same reference numbers. It is seen that the groove 14 is generally circular in cross-section, and the tip of stylus 20 substantially conforms to, and comes into contact with, the groove. By utilizing a dielectric coating 12 over the metallized disc, the exposed surface of the electrode 23 of stylus 20 can be brought into contact with the dielectric coating 12 thereby increasing the maximum-to-minimum capacitance ratio between the electrode 23 and the metallized layer 11 as the electrode scans the disc. When a uniform dielectric coating is employed, the distance between the electrode 23 and modulation elements 18 is maintained relatively constant so that different size styli or worn styli will still provide satisfactory performance. A polystyrene dielectric coating has a relatively low coefficient of friction, thereby reducing stylus wear.

The motion of stylus 20 relative to the groove 14 of FIG. 2 is transverse to the plane of the drawings. As the electrode 23 scans over the modulation elements 18, the area of the metallized disc immediately under the electrode varies forming a capacitor which varies in accordance with the recorded signal information. It is noted that, for the illustrative parameters, the metal surface of the depressed regions of the information track 16 which surround the modulation elements 18 is spaced more than .4 micrometer from the electrode 23, whereas the metal surface 11 of the modulation elements 18 is only separated from the electrode 23 by approximately 500 A. Thus, while the total surface area 11 below the electrode 23 is constant, the metal area which presents the significant capacitance to electrode 23 is that portion associated with the modulation elements 18. The capacitance thus formed is a function of (1) the area of the fixed electrode, which forms one plate of the capacitance and is constant; (2) the thickness of dielectric coating 12 which is also constant, and (3) metallized area 11 of the varying modulation elements 18 in FIG. 1.

Figure 3:
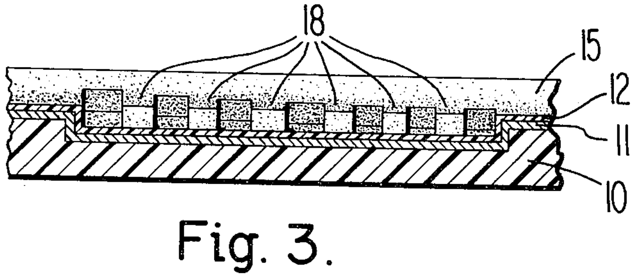
FIG. 3 is a cut-away side view of the groove of FIG. 1 illustrating the modulation elements located in the groove.

FIG. 3 is a side view of the groove 14 of FIG. 1 showing the modulation elements 18 as they appear in the cut-away side view. It is noted that, since the disc has a conductive surface, the electrode of the pickup stylus is effectively shielded from extraneous sources of capacity variations such as signal information or surface defects on the opposite surface of the disc (not shown) which may also be employed for recording, or from defects in the storage medium 10 itself. A relatively constant capacitance exists between the metalized layer 11 and ground which is in series with the signal capacitance (i.e., the capacitance between the pickup electrode 23 and the metallized layer 11). This capacitance can be relatively large and may be formed, for example, between the metallized layer 11 and a conductive turntable base which is grounded, or other grounded conducting objects in proximity to the metallized layer 11.

Figure 4:
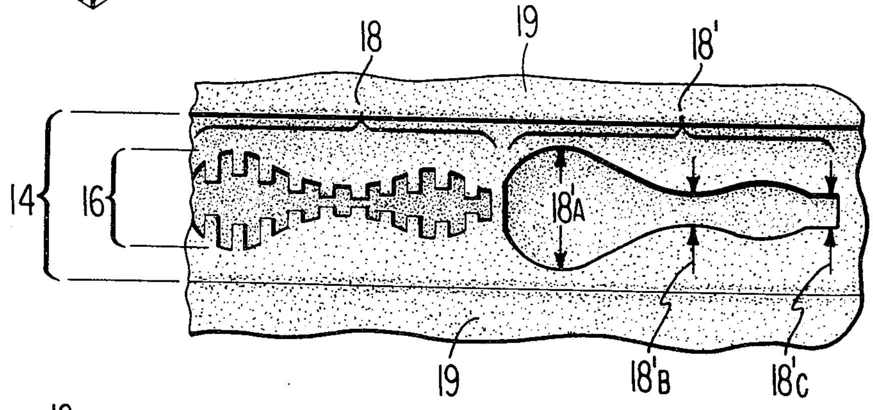
FIG. 4 is a top view of a portion of a groove of the general type shown in FIG. 1, and shows the information track width and a variety of modulation elements therein.

FIG. 4 is a top view of a portion of a FIG. 1 type record groove, illustrating two different recorded signal conditions. The left end 18 of the groove is modulated, with both low and high frequency information whereas the right end of the groove 18' is modulated with relatively low frequency information only. When the electrode 23 is over the portion of the groove illustrated as 18'A, the capacitance is at a minimum. When the electrode is over the position 18'B, however, electrode 23 is in close contact with a larger area of the metallized surface 11 and a greater capacitance is detected. At point 18'C in groove 14 it is seen that the information track 16 is completely closed over; thus, a maximum capacitance will be detected. This point may, for example, be a synchronization pulse in a composite television signal. As the pickup scans along the groove 14, capacitance variations corresponding to the modulation information occur between the electrode 23 and the layer 11. These capacitance variations can be electrically detected and converted to form video signals suitable for display by a television monitor.

FIG. 5 is a greatly enlarged perspective view of a stylus assembly 30 employing a single sapphire mounting structure, pursuant to a modification of the previously described stylus assembly. The sapphire mounting structure has a front surface 31 with a beveled edge 33 leading down to a second beveled edge 35. A rear surface 34 of the sapphire mounting structure has a conducting element 38 deposited thereon to form the conductor for detecting capacitance variations. The surface 32, between the front and rear faces 31 and 34, respectively, is beveled inwardly toward the from surface 31 to allow the stylus some freedom of motion in the groove 14 of the disc 10. A corresponding beveled surface is not shown but is understood to be formed on the opposite side of the generally trapezoidal shaped stylus tip. Thus, the front surface 31 of the stylus has a triangular cross section, similar in shape to the electrode 38 cross section, but somewhat smaller due to the beveled side surfaces. The disc motion is from the left to right as indicated by the arrow in the drawing. The mounting structure may be fabricated from sapphire which is originally shaped to have a peak portion 37 (shown in dotted lines in the drawing) which is removed by lapping, as explained above in conjunction with FIG. 1, to conform the stylus tip to the shape of the groove 14. As illustrated, the conducting element 38 may cover the entire rear surface 34 of the stylus assembly 30, deposited to a depth (39) which may be, for example, 0.3 micrometers.

FIG. 6A is a top view of groove 14 including an information track 16 whose width substantially covers the width of the groove 14, illustrating recording in the form of an amplitude modulated carrier, pursuant to an embodiment of the present invention. The left portion of the illustrated groove, indicated as the portion 42, shows the unmodulated carrier which comprises alternate areas of signal elements 41 and depressed areas 43 (latter indicated by shading in the drawing). Thus, as the pickup stylus (not shown scans along the groove, the modulation elements 41 will be in contact with the conducting element of the pickup stylus, whereas the depressed areas 43 will be spaced at least .4 micrometer from the pickup stylus. The capacity between the conductive element and the modulation elements 41 (which are understood to include a metallized surface having a dielectric coating thereon) is shown diagrammatically in FIG. 6B by the pulses 41' which correspond in location to the signal elements 41 in FIG. 6A. FIG. 6C indicates the capacitance between the conducting element in the intervals corresponding to the depressed areas 43. Over the interval 42, no appreciable capacitance exists between the conducting element of the pickup stylus and the metallized surface at the bottom of the depressed areas. FIG. 6D represents the total capacitance detected by the pickup stylus as it moves along the groove 14. This figure may also represent, for example, an output signal from electrical pickup circuitry shown in FIG. 15.

Figure 15:
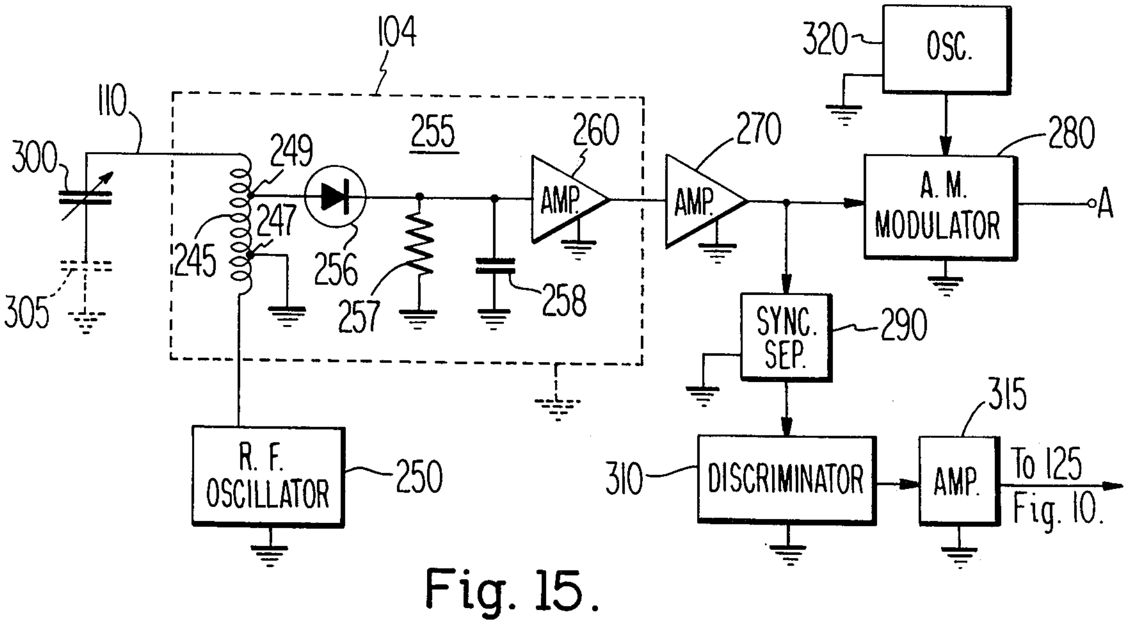
FIG. 15 is a circuit diagram partially in schematic and block form of playback circuitry that may be employed to process the capacitance variations detected by the pickup electrode in the playback mechanism of FIG. 10.

As the carrier signal is modulated by signal information at the right end of the groove (shown by the interval 44), the information track in the groove is selectively cut away in the pattern illustrated in the figure. Successive locations 45–50 are shown which provide capacitance contributions illustrated in FIG. 6B by the elements 45', 47' and 49' and in FIG. 6C by the elements 46', 48' and 50'. It is seen that the modulation element locations (41 at the left side of the groove) may have portions of the narrow areas depressed in greater or lesser amounts, while the previously completely depressed areas (43 in interval 42) may be more or less completely depressed during the modulation interval 44. One feature of such a modulation system is that corresponding pairs (i.e., 45–46, 47–48, and 49–50) provide a substantially constant support area to the pickup stylus as it moves along the groove. Although providing a substantially constant support area, the modulation format varies the detected capacitance in accordance with recorded signal information. The boundaries between the unshaded and shaded portions are drawn in heavy lines to indicate the modulation. FIG. 6D illustrates the combined detected capacitance due to each interval 45–50 of the remaining elements shown. It is seen that during the interval 52 included in the modulation interval 44 the capacitance remains constant as shown by FIG. 6D. Considering FIG. 6D as also illustrative of the output signals from an electrical pickup circuit (as shown in FIG. 15, to be later described), such a signal will remain at a constant level (zero) during the interval 52.

FIG. 7A is a top view of a portion of a groove 14 including a signal information track 16 which substantially covers the width of groove 14. Illustrated in the groove is a frequency modulation type of recording format pursuant to another embodiment of the present invention in which a carrier signal represented by the elements 53 and 54 at the left end of the groove portion may be frequency modulated by signal information. The depressed areas (54, for example) are indicated by shading in the drawing. At the left end of the illustrated groove, the depressed areas 54 and the interleaved signal element areas 53 represent an unmodulated carrier. As with the amplitude mdoulation scheme described in conjunction with FIG. 6, the capacitance pickup will detect a maximum capacity between the conducting element in the pickup stylus and the metallized surface of the disc (of which groove portion 14 is a part) when the conducting element is centered above a modulation element and comes into contact therewith. When the conducting element is aligned with a depressed area, the distance between the conducting element and the metallized surface of the disc is increased and the capacitance decreases. By varying the spacing between the successive depressed areas (e.g., widening the elements 55, 56, 57 and 58), the detected capacitance varies. FIG. 7B shows diagrammatically the accompanying capacitance variations and is drawn to align the capacitance variations 55', 56', 57' and 58' with the corresponding signal elements 55, of FIG. 7A. As the pickup stylus scans over the modulation information, it is seen that the negative going capacitance portions of FIG. 7B correspond to the constant width depressed areas interleaved with the elements 55, 56, 57 and 58 of FIG. 7A. The spacing between successive depressed areas is varied by the signal to provide the signal information recording. Although FIG. 7B is a graph of the capacitance changes, it may also represent an electrical signal provided by the pickup circuitry shown in FIG. 15. The method by which information is recorded on the video disc in the various recording formats discussed with regard to FIGS. 1–7 is described in detail below in the discussion of the manufacture of a video disc.

Figures 9, 9A, 9B, 9C, 9D, 9E, 9F, 9G, 9H, 9I, 9J:
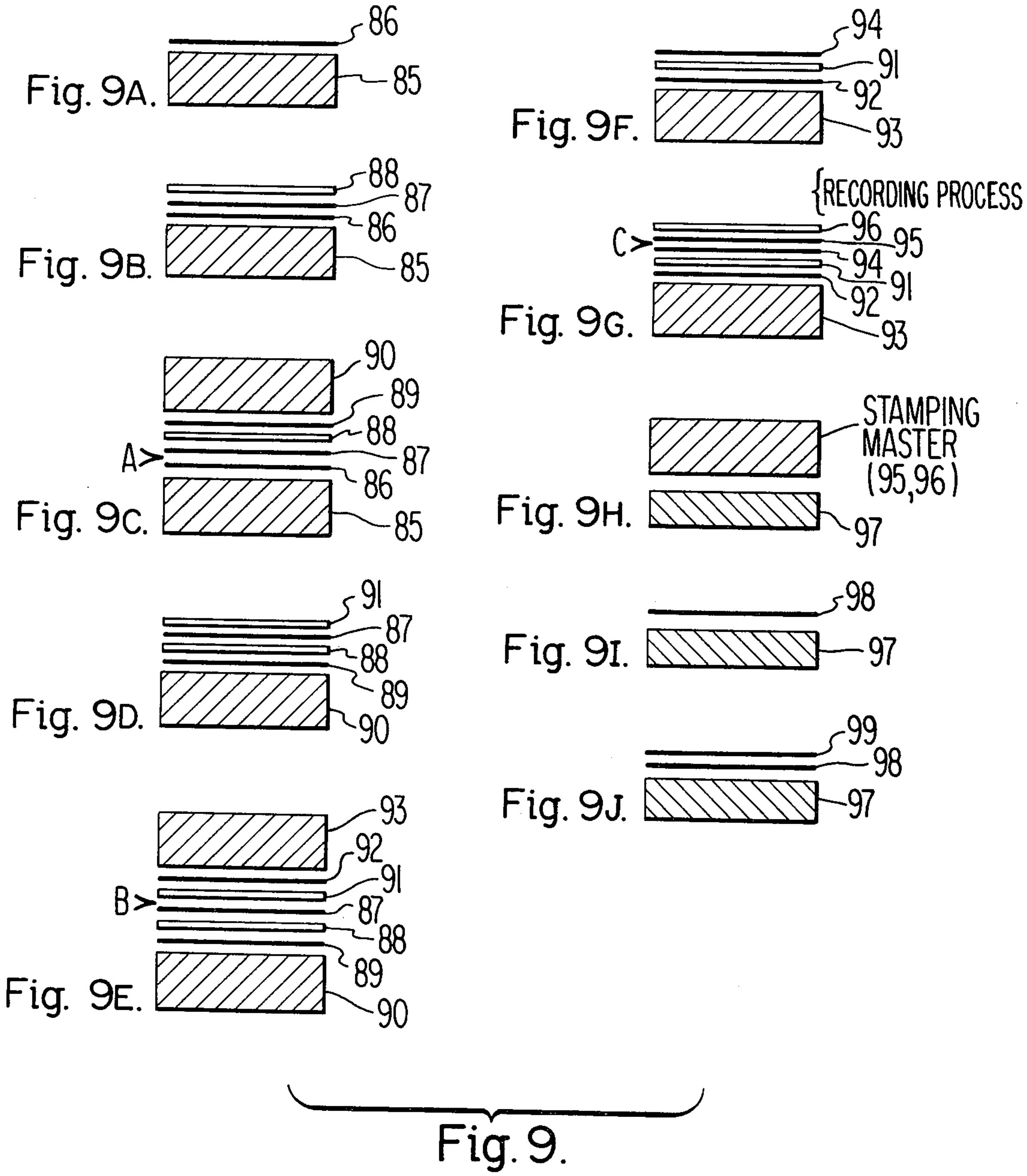
FIG. 9 is a flow diagram illustrating in portions 9A through 9J a process by which a capacitive video disc may be manufactured.

The storage medium 10 (shown in FIG. 1) may be pressed from a recording medium such as a nickel stamping master in much the same manner as a phonograph record is manufactured. Due to the extremely small dimensions of the grooves and modulation elements, however, the fabrication of such a stamping master may be relatively complex. A flow chart, shown in FIGS. 9A–9J, aids in understanding of the various steps of an illustrative procedure which may be employed to obtain a completed video disc. The flow chart portion between FIG. 9A and FIG. 9G represents an illustrative seven-step process for stamping master production, which will now be described in detail.

1. In FIG. 9A, a base disc 85 of a one-half inch thick aluminum blank 14 inches in diameter is machined flat to 0.0002 inches. A protective coating of pyralin polyimide is applied to the machine aluminum surface to prevent chemical attack of the aluminum base through pinholes in a lacquer coat which is next applied to the base disc. A uniform layer 86 approximately 0.005 inches thick of Randolf recording lacquer is applied to the polyimide surface. After drying, the lacquer is machined flat to 0.0002 inches and the original grooves, comprising a single closed end 360° groove at the outer periphery of the disc and a spiral groove, are machined in the lacquer using a sapphire cutting tool having a radius of 0.0002 inches. The depth of the cut is 0.0005 inches and the spiral groove pitch is approximately 1,000 grooves per inch.

2. After sensitizing the surface of the lacquer coating with a solution of stannous chloride, a conductive coating of silver 87 is chemically deposited on the lacquer. A nickel layer 88 is then electro-plated to the silver coating to a depth of 0.010 inches to form a nickel replica of the lacquer layer. As shown in FIG. 9B, the entire disc is in a sandwich form comprising the aluminum base disc 85, a lacquer coating 86 with the original grooves, a silver coating 87, and a layer of nickel 88 having negative grooves (negative grooves are defined as being the inverse of the original lacquer grooves).

3. As shown in FIG. 9C, the nickel replica is then cemented to a second aluminum base 90 which is prepared is a manner similar to the first base. Epoxy 89 is spread over the machined surface of the second aluminum base and the second aluminum base is pressed onto the electro-plated nickel replica to bind the nickel replica to the second aluminum disc. When the epoxy has partially cured, the sandwich structure is clamped into a fixture which is employed to separate the two aluminum discs at the interface A between the lacquer coating 86 on the first aluminum disc and the chemically deposited silver 87.

4. Once separated, the second base includes the nickel replica 88 epoxied to the base 90 and the silver coating 87 over the nickel. The grooves in the nickel are a negative replica of the original lacquer grooves. The silver layer is then passivated with a solution of potassium dischromate. A second nickel layer 91 0.010 inches deep is then electro-plated onto the passivated silver coating to form the nickel recording master shown in FIG. 9D. The grooves in the nickel recording master (which is a replica of the original nickel replica) are positive (a positive groove being defined as the same as the original lacquer grooves).

5. A third aluminum disc 93 is prepared in the same manner as the first and second discs and epoxy 92 is applied to its machined surface. As illustrated in FIG. 9E, the third disc 93 is then pressed to the nickel recording master on the side opposite from the grooves. Once the epoxy has partially cured, the entire structure is placed in the separating fixture and the nickel recording master is separated from the nickel replica at the interface (illustrated as point B in FIG. 9E) between the electroplated nickel master 91 and the passivated silver coating 87.

6. The nickel recording master has positive grooves on its surface which is then cleaned. A positive working photoresist 94 is then applied to the surface of the nickel recording master as illustrated in FIG. 9F. Once the photoresist has dried, a small area of the locked groove has its photoresist removed and an Aquadag dot 1/16 inch is placed on the exposed metal surface. Adjacent to the dot several scratches are cut. The dot and scratches serve as a target for the electron beam of a scanning electron microscope (S.E.M.) which is used in the recording of the signal information and are used to adjust the beam current of the S.E.M. and to focus the S.E.M. beam respectively. The disc is now ready for exposure by the beam of the scanning electron microscope to modulate the spiral groove with information to be recorded. The recording is accomplished by selectively exposing the photoresist coating which covers the recording master surface and is completed between the steps 9F and 9G of the flow chart of FIG. 9.

Since the dimensions of the spiral groove and signal information therein are relatively small care must be exercised to properly align and mount the recording master before the recording process is begun. A description of the procedure used is given here:

After the photoresist coating is deposited on the nickel recording master, the structure including its aluminum base is mounted on a turntable fixture located in a vacuum chamber adapted to operate in conjunction with a scanning electron microscope (S.E.M.) utilized to expose the photoresist. The S.E.M. employed in one application was a Stereoscan Model No. 2A manufactured by Cambridge Scientific Instruments Ltd. Adjustments are provided on the turntable for aligning the master using a dial indicator gauge to insure the surface of the disc is in a horizontal plane within 0.0004 inches (peak to peak deviation). Before the chamber is evacuated, the record is also inspected and its position on the turntable adjusted so that it is concentrically mounted. This is accomplished by using an optical microscope having a cross hair recticle under which the locked groove is positioned. The locked groove is a separate single 360° groove at the outer periphery of the nickel recording master. As the turntable is rotated, the position of the recording master is varied relative to the center of rotation of the turntable to insure the locked groove remains under the intersection of the cross hair recticle (within ± 0.0005 inches) during a complete revolution.

Once the record master is mounted on the turntable and properly aligned, it is positioned such that the S.E.M. beam will impinge on the Aquadag dot placed near the locked groove during the processing of the record master. It is noted that the optical microscope is mounted above the turntable such that its field of view will have its center coincide with the center of the S.E.M. electron beam landing area. When the record master is prepositioned such that the Aquadag dot on disc is located at the center of the field of view of the optical microscope the beam from the S.E.M. will impinge on the Aquadag dot once the optical microscope is removed and the column of the S.E.M. is placed above the turntable. After optically prepositioning the record master, the optical microscope is removed and the S.E.M. column is coupled over the vacuum chamber which is now evacuated.

The electron beam of the S.E.M. falls on the Aquadag dot to which an electrical contact is made through the conductive nickel so that the S.E.M. electron beam current can be measured. The beam current is adjusted to its desired level by measuring this current. The turntable is then translated slightly so that the beam falls on the scratches adjacent the Aquadag dot and the S.E.M. is focused on the scratches using the normal S.E.M. focusing procedures.

Once the beam is focused and the current is set, the turntable is translated radially inward to the flat land area between the locked groove and the spiral groove. This area is relatively flat and serves as the calibration surface for a balanced type position detector which responds to reflected electrons from the surface of the photoresist on the recording master. The detector is calibrated for a null reading when the beam is located over the relatively flat land area but produces an output signal when the beam falls on a slanted surface and therefore will provide signal information as to the position of the electron beam of the S.E.M. relative to a groove. Once the detector is calibrated, the turntable assembly is translated radially inward until the spiral groove is detected by the position detector.

The turntable is rotated by a drive mechanism and brought to its recording speed, illustratively 0.9 r.p.m. held constant to approximately 1%. As the position detector indicates alignment with the center of the spiral groove, a control system utilizing the output signal from the position detector is activated to lock the electron beam to the center of the groove. Simultaneously, the radial drive translation mechanism is activated such that the turntable is moved under the landing point of the S.E.M. electron beam at a rate of one groove spacing per revolution of the turntable. The rotation of the turntable is controlled by closed loop system to maintain the rotational speed constant. As the recording master is rotated and translated under the beam, the photoresist is selectively exposed by the electron beam of the S.E.M. by deflecting the electron beam across the groove at a predetermined rate and by blanking the electron beam in an appropriate manner to record the signal information. Illustrative electrical circuits which may be employed to provide the signals for modulation of the electron beam of the S.E.M. are shown in FIG. 8, and will now be described (before returning to the flow chart consideration).

Figure 8:
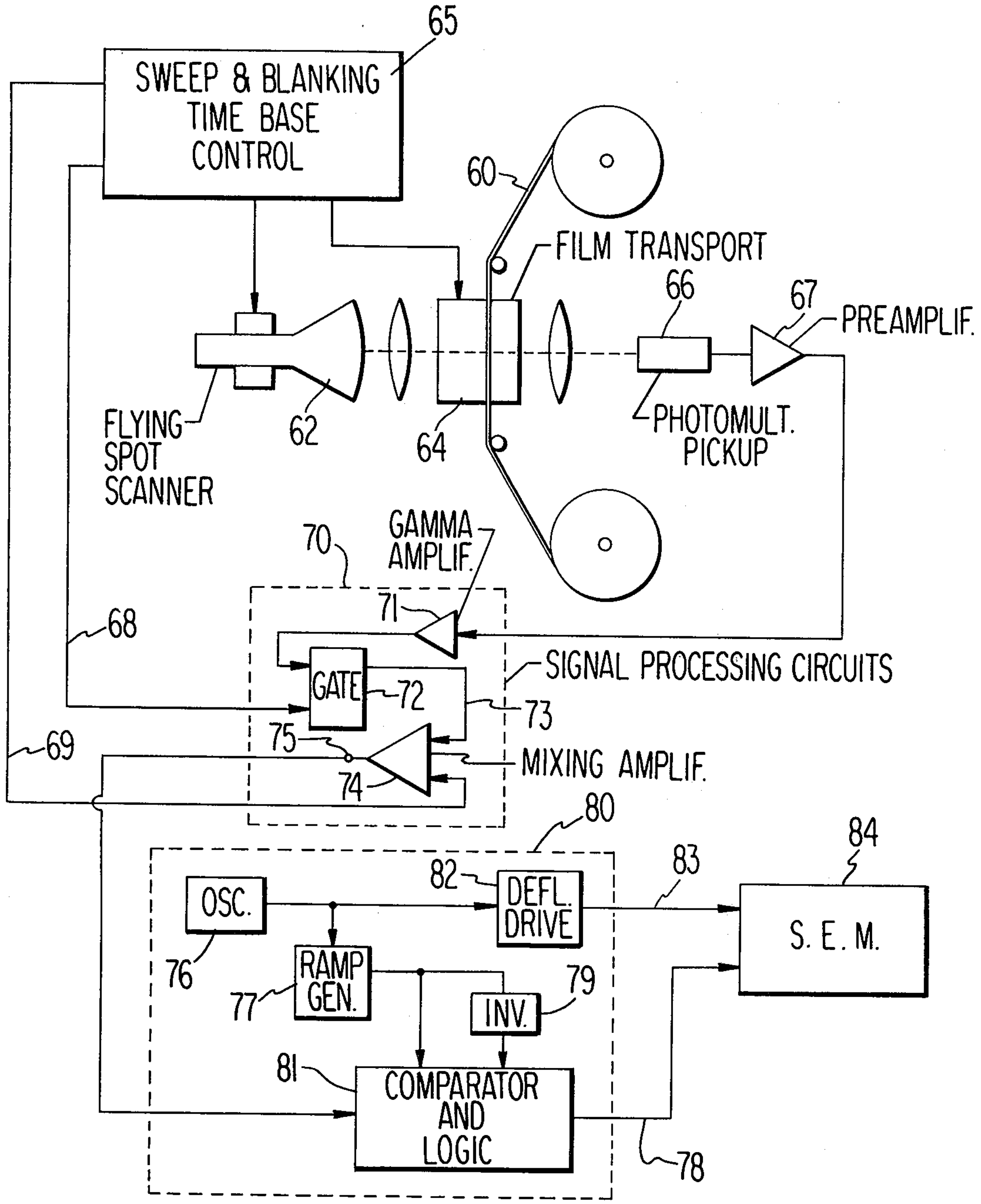
FIG. 8 is a circuit diagram partially in block form showing a source of signals to be recorded and recording circuitry which may be adapted to effect recording in accordance with techniques exemplified by the modulation patterns of FIGS. 1, 6A or 7A.

In FIG. 8, a source of film 60, having recorded thereon optical images in the form of successive frames of pictures in a format similar to motion picture film, is passed between a flying spot scanner tube 62 and a photo multiplier tube pickup means 66. The flying spot serves as a source of illumination which sweeps over each frame of optical information contained on the film 60 in a raster similar to a television sweep raster pattern. A sweep and blanking time base control circuit 65 generates a deflection signal which is applied to the deflection yoke of the flying spot scanner tube and a control signal which is applied to an electro-mechanical film transport 64. This signal application serves to synchronize the deflection rate of the electron beam of the flying spot scanner tube 62 with the action of the film transport mechanism 64 such that, as each frame of the film 60 is completely scanned by the light spot associated with the beam of the flying spot scanner, the film transport mechanism 64 will move a successive frame into position between the flying spot scanner tube 62 and the photo multiplier 66. Suitable optical means are employed to project the light from the flying spot scanner to the film, and from the film to the photo multiplier.

Circuit 65 further includes a blanking signal generator and a synchronization signal generator for developing blanking and horizontal and vertical sync signals which are applied to a signal processing stage 70 by means of conductors 68 and 69 respectively. The blanking and sync signals are in predetermined time relationship with the deflection signal from circuit 65 and provide a recording signal which when detected during playback of the video disc is a standard composite television signal. In one embodiment, the sync and blanking signals from circuit 65 were time expanded by a factor of approximately 400 (as compared with standard N.T.S.C. signals), and were generated using an oscillator and suitable counting stages and logic circuits to provide the desired signals. It is noted that the system shown includes a single photo multiplier for use in detecting luminance signals only; if color signals are to be processed and recorded, three photo multiplier tubes with appropriate color filters may be employed to obtain the necessary color information from the film 60. An amplifier 67 amplifies the electrical signal output from the photo multiplier 66 and applies this analog signal to the signal processing stage 70.

The signal processing stage 70 includes a gamma correction amplifier 71 to predistort the linear luminance signals from the photo multiplier 66 into standard television video signals. Blanking signals from circuit 65 are applied to a gate circuit 72 by means of conductor 68. Also applied to the gate circuit 72 are the video signals from amplifier 71. During the vertical and horizontal blanking intervals, gate 72 responds to the applied blanking signals to block the video signals, thereby preventing their application to the mixing amplifier 74 by means of conductor 73. In the absence of blanking signals, the video signals from amplifier 71 will be passed through the gate circuit 72 and will be present on conductor 73.

Mixing amplifier 74 may be an operational amplifier, with horizontal and vertical synchronizing signals applied to one input by means of conductor 69, and the blanked video signals applied to the other input by conductor 73. The amplifier 74 combines these signals to insert the synchronizing signals during the blanking intervals to form at its output terminal 75 composite television signals which are then applied to modulator circuit 80. The circuitry of FIG. 8 described thus far is common to all three types of modulation previously described (i.e., baseband, AM and FM).

Modulator 80 includes an oscillator stage 76 which, illustratively, develops 30 KHz signals which are applied to a ramp generator 77 to develop sawtooth shaped 30 KHz signals. The output of oscillator 76 is coupled to the deflection drive circuit 82 which is coupled to the beam deflection circuits of a scanning electron microscope (S.E.M) 84 by means of conductor 83 to provide a sweep control signal. The output of generator 77 is further coupled to a comparator and logic circuit 81, and to an inverter stage 79. The output of the inverter is also coupled to stage 81. Video signals from the signal processing stage 70 are also applied to stage 81. The output of the comparator and logic stage 81 is coupled to the blanking control circuit of the S.E.M. 84 by means of conductor 78. Modulation of the recording master is accomplished by sweeping the electron beam of the S.E.M. transversely across the groove and selectively un-blanking the electron beam to expose the photoresist in the groove.

The modulator circuit 80 provides the sweeping and blanking signals to the S.E.M., and its operation to provide for a first example, the AM carrier modulation shown in FIG. 6A will now be described.

Referring to FIG. 6A, the depressed areas 43 in a video disc correspond to un-blanked sweep excursions of the beam of the S.E.M. over the positive photo resist of the recording master (layer 94 of the recording master shown in FIG. 9F). Areas 41 between the depressed strips 43 correspond to sweeps of the S.E.M. electron beam where the electron beam is cut off (i.e., blanked). When no video signal is present at the input to the comparator and logic circuit 81 of modulator 80, the logic circuit blanks the electron beam of the S.E.M. during alternate sweep intervals to record the un-modulated carrier signal as shown at the left portion 42 of FIG. 6A. The exposed areas 43 represent negative swings of a carrier signal, for example, and the unexposed areas 41 represent positive swings of the carrier signal. The information track is modulated by the video information as the video signal increases from zero by increasing the unblanked portion of alternate areas (odd numbered in the drawing) while increasing the blanked portion of the interleaved areas (even numbered). As a video signal of varying amplitude is applied to stage 81, the comparator compares the amplitude of the video signal with a reference signal (which is developed from the signal from the ramp generator 82 and the inverter circuit 79) to provide a blanking signal at conductor 78 which varies in accordance with the video signal. In FIG. 6A, for example, the unblanked portion of the odd sweep intervals 45, 47, etc. (shown at the left side of portion 44 of the signal track 16) increase with increasing video and the unblanked portion of the even sweep intervals 46, 48, etc. decrease with increasing video. The video is the same for intervals 45 and 46, decreases at point 47, is the same for 48 and then increases from 49 to 51. The heavy outlined edges of the blanked and unblanked modulation elements graphically illustrate the waveform shape of the video signal. Thus, in the presence of a video signal, the percentage of each blanked and unblanked portion of successive sweep intervals of the electron beam of the S.E.M. becomes a function of the existent video level during the sweep intervals. It is necessary to select a sweep rate sufficiently high to insure the video sampling rate provides the desired resolution. A 30 KHz rate employed in one embodiment provided approximately 600 sweep intervals for each horizontal television line during playback of the video disc at 360 RPM when the recording master was rotated during recording at 0.9 RPM. In the AM carrier modulation system, the comparator and logic circuit 81 insure this AM modulation configuration which presents essentially a constant support area for the pickup stylus while providing a capacitance variable in accordance with the video signal.

In the baseband modulation system, however, the logic circuit 81 is modified such that the electron beam of the S.E.M. will, during each sweep line, be unblanked in accordance with the video signal level.

In the FM modulation system shown in FIG. 7, the modulator 80 can be modified to provide a blanking signal to the S.E.M. which has unblanked intervals of equal duration but with the spacing between successive unblanked intervals varying in accordance with the video signal applied to the modulator.

When the recording is completed, the recording master is removed from the vacuum chamber and the photoresist is developed to etch away the exposed areas in the grooves.

While illustrative parameters have been given above, it will be appreciated that they can be varied to alter the recording time or produce modulation signals on the photoresist at various intervals. If, for example, the intensity of the electron beam is increased, the turntable speed can be increased for a constant exposure of the photoresist. For an equivalent spacing of each modulation element, the sweep frequency of the electron beam would also be increased.

Turning again to the flow chart in FIG. 9, after the recording process is completed, step seven of the seven-step process is performed.

7. A stamping master is fabricated from the nickel recording master (having the exposed and developed photoresist coating) by depositing a coating of nickel (95 in FIG. 9G) by an electroless process which is described in detail in a copending application entitled "Method of Making Duplicates of Optical or Sound Recording", Ser. No. 862,019, filed on Sept. 29, 1969 and assigned to the present assignee. The stamping master is then completed by electroplating a layer of nickel, e.g. Ni (96), 0.008 inches thick onto the electroless plated nickel coating. The nickel stamping master is then separated from the nickel recording master at the interface (indicated as point C in FIG. 9G) between the electroless nickel coating 95 and the developed photo-resist 94. The stamping master has negative grooves on its surface including modulation elements therein and can be used for stamping vinyl records which will have positive grooves corresponding to the desired original lacquer grooves.

Once the nickel stamping master 95, 96 has been fabricated, it can be employed to mass produce vinyl disc replicas 97 in FIG. 9H in conventional record stamping machinery such as that used in the audio record industry.

The vinyl disc is then metallized as represented in FIG. 9I by the metal layer 98, and a dielectric coating 99 (FIG. 9J) is next applied to the metallized surface. These final processing steps may be carried out, as follows: First, the vinyl disc is thoroughly cleaned. The metallization step shown in FIG. 9I is accomplished using a vacuum chamber, and a material such as aluminum is vapor deposited to a thickness of 500 A over the surface of the vinyl disc. A coating of suitable dielectric material such as polystyrene is then glow discharge deposited in a vacuum chamber on the metallized surface to a depth of approximately 500 A, thus completing the processing of the disc.

Although the recording method heretofore described for exposing the photoresist on the recording master employed a scanning electron beam microscope, it is possible in some applications to alternatively utilize an optical scanning source for exposing the photoresist. With certain types of modulation systems, such as the described FM system, it is also possible to mechanically cut the recording master by employing a cutting stylus which has its position modulated with signal information.

Having described the video disc and methods for its manufacture, a description of a playback mechanism and electrical circuitry which may be employed detect the recorded signal information and convert the detected capacitance variations into useable electrical signals is now presented.

Figure 10:
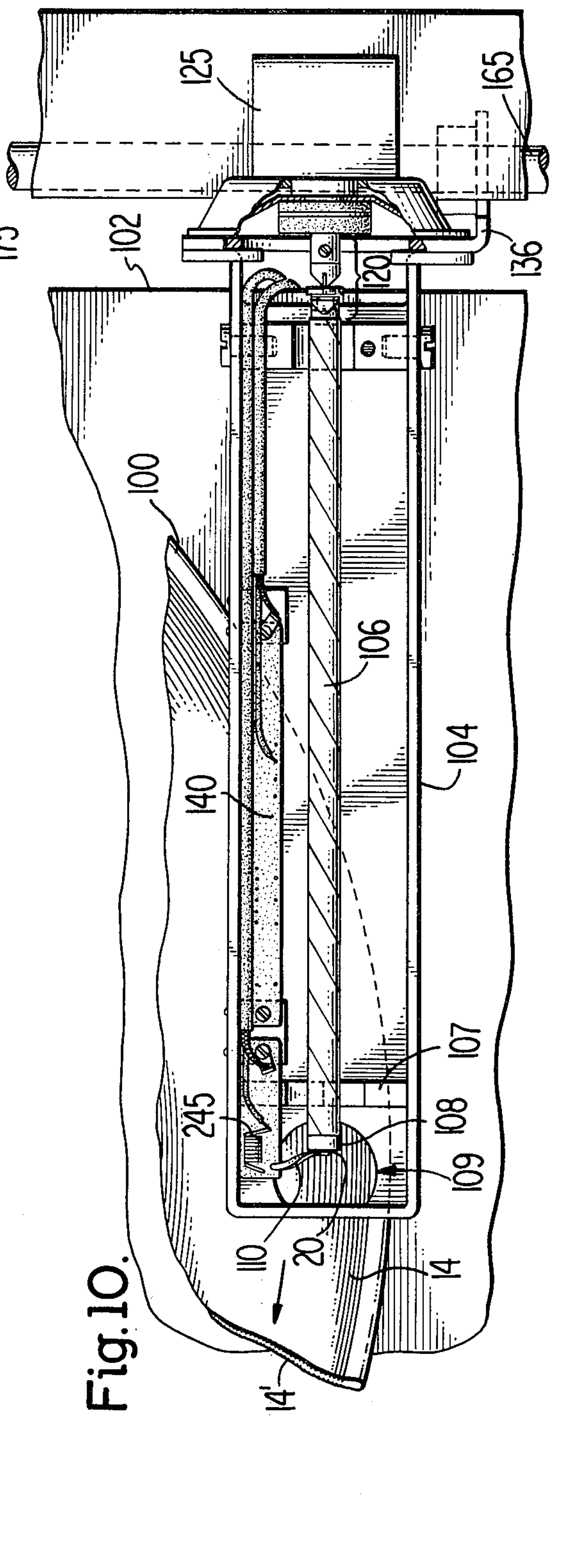
FIG. 10 is a top view of a playback mechanism which may be employed to play back a video disc produced per FIG. 9, the view showing a pickup arm assembly and a portion of a player mechanism suitable for scanning the video record disc.

FIG. 10 is a top view of the record player mechanism on which a video disc 100 is placed. Disc 100 includes a spiral groove 14 on the top surface of the disc and, as shown in the figure, a spiral groove 14' on the under side of the disc. Groove 14' likewise contains signal information to playback by the player mechanism. The mechanism includes a turntable mounting board 102 which has a drive motor and drive mechanism not shown in the FIGURE. A shield enclosure 104 includes a stylus arm 106 which rests on a stylus arm centering bracket 107, when the machine is not operating. The stylus 20 is attached to the stylus arm 106 by means of a stylus mounting cap 108. An aperture 109 in shield enclosure 104 permits the stylus 20 to pass through the shield enclosure and contact the disc 100. The electrical connection to the electrode imbedded in the stylus is made by means of a flexible conductor 110 which may be fabricated from beryllium copper, for example. The stylus arm 106 is attached to a groove velocity error correction drive mechanism 125 by means of a flexible pivot assembly 120 which allows the stylus arm 106 to move in a lateral as well as vertical direction during operation. The flexible pivot assembly 120 is described in detail in a copending application of Marvin A. Leedom, Ser. No. 126,677, entitled "Stylus Arm Pivot" and assigned to the present assignee.

The shield enclosure 104 and stylus arm 106 are driven to allow the stylus 20 to track the groove 14 by means of a drive shaft 130 which is engaged by an engaging mechanism (not shown in FIG. 10) coupled to the shield enclosure 104 by means of a shield enclosure bracket 136. In operation, the shield enclosure 104 including the stylus arm 106 is moved transversely across the record by means of the drive shaft 130 to provide approximate tracking with the groove 14. The flexible pivot 120 as well as the flexible conductor 110 allows the stylus arm 106 to float on the disc 100, thereby permitting the stylus 20 to track surface deviations in the disc such as warping. The relative groove velocity error correction drive mechanism 125 is an electromechanical transducer driven by electrical signals by the circuitry shown in FIG. 15 to compensate for velocity errors due to turntable speed variations, record eccentricity or other velocity errors. The operation of the groove velocity corrector 125 is described in detail in U.S. Pat. No. 3,711,641, issued on Jan. 16, 1973 to Richard C. Palmer, and entitled "Velocity Adjusting System." In some applications, picture jitter caused by velocity errors can be substantially reduced by modifying the horizontal automatic frequency control (AFC) system of the television receiver used to display the video signal. If such an application, the time constant of the AFC filter is changed to allow the controlled horizontal oscillator to follow the frequency variations of the detected sync pulses due to the velocity errors.

The shield enclosure 104 may also house some of the electrical circuits of FIG. 15 to minimize stray capacitance and electrical interference by placing the detecting circuits in close proximity with the pickup stylus 20. An inductor 245 to which the electrode 23 is coupled can be mounted on a circuit board 140 without affecting the tracking weight of the stylus 20, since the stylus arm 106 is free floating and independent of the weight of the stylus shield enclosure 104. The other circuit components enclosed within the dashed rectangular box 104 in FIG. 10 may also be mounted on circuit board 140. A typical tracking force on the stylus 20 is approximately 0.5 grams.

Figure 11:
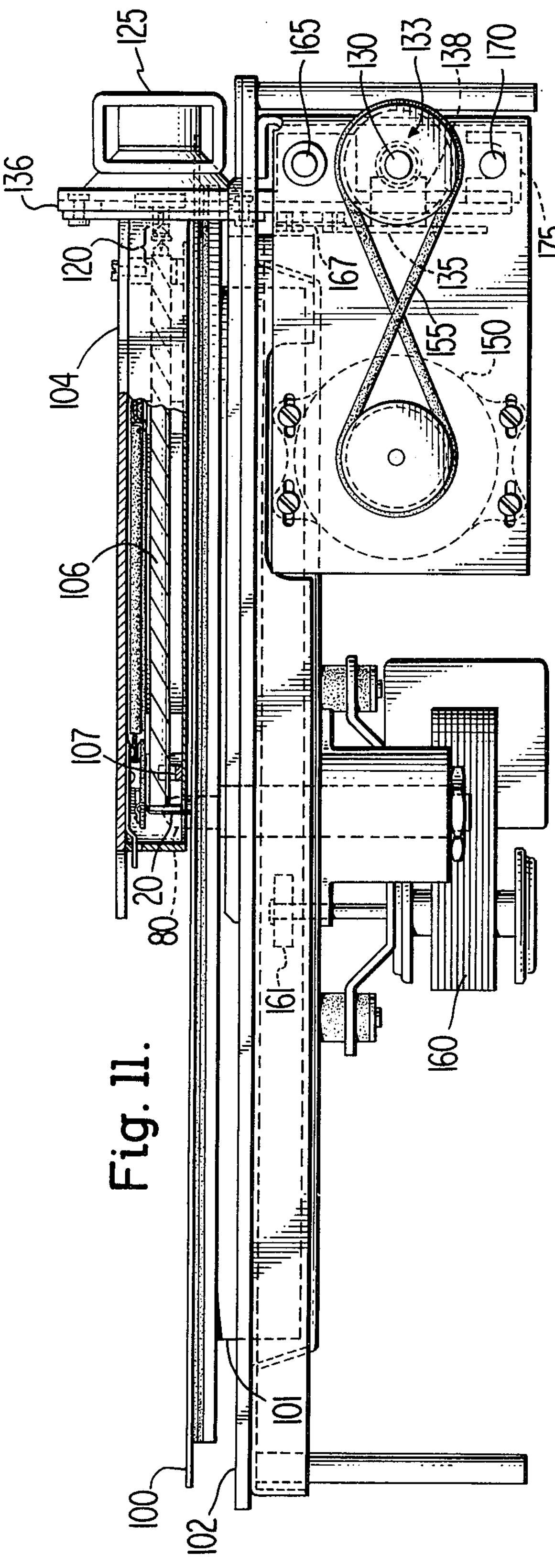
FIG. 11 is a side view of the playback mechanism of FIG. 10, showing the turntable and drive mechanism as well as the pickup arm assembly.

FIG. 11 shows a side view of the turntable mechanism showing the arm feed drive motor 150 which is coupled to the drive shaft 130 by means of a drive belt 155 and drive pulley 133. The speed of motor 150 is selected such that the shield enclosure 104 moves radially and over the disc 100 in proper time relationship to the rotational speed of the disc 100. Thus instead of relying on the spiral groove to pull the stylus arm assembly across the disc, the shield arm enclosure 104 is positively driven by motor 150. FIG. 11 also shows the turntable drive motor 160 which is synchronous motor which drives the turntable 101 (illustratively at a rotational speed of 360 r.p.m.) by means of a friction drive wheel 161 coupled to the shaft of motor 160. The disc 100 is centered on turntable 101 by means of a spindle 80 which fits through a centering hole (not shown) in the disc. The components shown in FIG. 11 which are identical to those shown in FIG. 10 have identical reference numerals. Also shown in FIG. 11 is the engaging plate 135, the arm slide bar 165, the stop bar 170 and the arm height adjustment mechanism 175 the function of which are described below in the description of FIG. 12.

Figure 12:
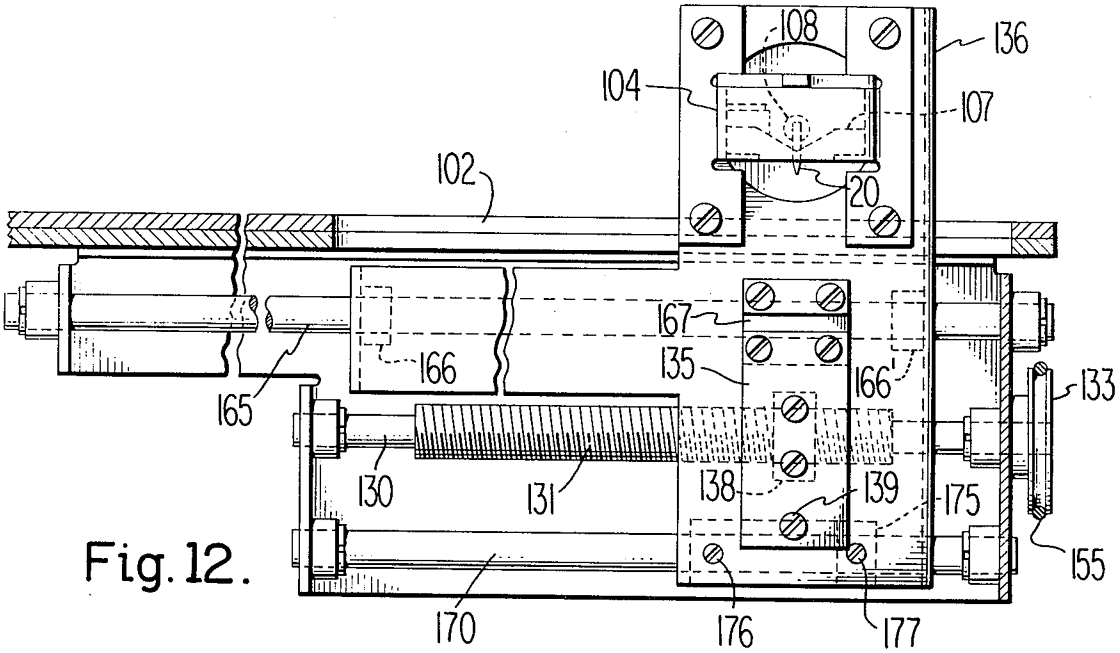
FIG. 12 is a front view of the playback mechanism of FIG. 10, showing the stylus and the stylus arm drive assembly.

FIG. 12 shows a front view of the mechanical means for driving the shield enclosure 104 across the disc 100. The parts which are identical to those in FIGS. 10 and 11 are labeled with identical reference numerals. It is seen that the drive shaft 130 has a threaded lead screw portion 131 to which the shield arm enclosure bracket 136 is coupled by means of an engaging mechanism 138. The length of the threaded lead screw 131 is selected so that before the pickup stylus is placed in a groove in the video disc, the engaging mechanism 138 will not engage the threaded portion 131 of shaft 130 shown to the right in the FIG. As the innermost groove segment of the disc is reached during playback, the engaging mechanism reaches the end of the threaded lead screw 131 and the pickup arm stops.

The shield enclosure bracket 136 in FIG. 12 is pivotally mounted on an arm slide bar 165 by means of slide bearings 166 and 166' on either end of the bracket 136. The engaging plate 135 is mounted to the shield enclosure bracket 136 by means of a leaf spring 167 which provides a bias pressure to plate 135. The engaging plate 135 includes a split nut type engaging means 138 which in a preferred embodiment was a teflon pad. An adjustment screw 139 is provided to insure the engaging means 138 disengages the lead screw 131 when the shield enclosure 104 is lifted after playback and returned to its rest position.

A height adjustment mechanism 175 is mounted to the shield enclosure bracket 136 by means of an anchor bolt 176. The height adjustment mechanism 175 engages a stop bar 170 as shown in FIG. 11 to limit the travel of shield enclosure 104 in the vertical direction. A height adjustment screw 177 is provided to set the proper limits of travel for shield enclosure 104.

In operation, as power is applied to the player mechanism, the drive shaft 130 is rotated by means of the drive belt 155 and drive pulley 133. The shield enclosure 104 is manually lifted and placed in the lead groove of the disc. When so placed, the engaging mechanism 138 will be located over the lead screw portion 131 of rotating shaft 130 and as the shield enclosure 104 is lowered, the engaging mechanism will engage the lead screw 131 and shield enclosure 104 thereupon will be driven transversely across the disc such that the stylus arm 106 will track the proper grooves. As the end of the disc is reach (i.e., the innermost groove) the engaging mechanism 138 will have come to the end of the lead screw 131 and will automatically disengage therefrom. The shield enclosure 104 can then be returned to its initial position or any position of the video disc. Although the player mechanism shown is manually operated, it could readily be adapted for automatic operation.

Figure 13:
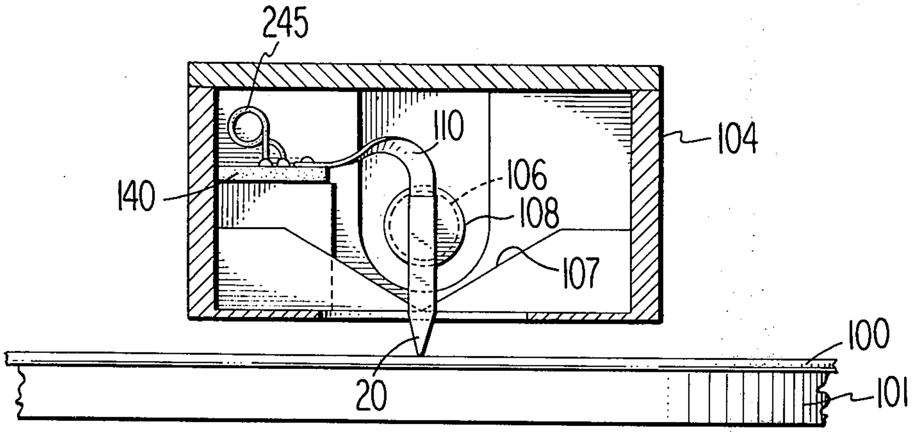
FIG. 13 is a front view of the pickup arm assembly of FIG. 10, showing the placement of the stylus relative to the stylus arm and shield enclosure and the video disc.

FIG. 13 shows an enlarged view of the stylus arm 106 and stylus arm centering ramp 107 as well as some of the other components shown in FIG. 10. As the shield enclosure 104 is lowered such that the stylus 20 engages a groove (not shown) in the disc 100 supported by the turntable 101, the stylus arm 106 will be lifted from the centering ramp 107 because of the horizontal and vertical compliance of the flexible connector 110 and the pivot assembly 120 (shown in FIG. 10). The stylus arm centering ramp is designed such that during playback the stylus arm 106 will not contact the ramp. If the drive mechanism produces a minor tracking error, the stylus arm 106 will be able to move laterally to follow the groove. At the end of the playing of the disc when the shield enclosure 104 is lifted, the stylus arm 106 will return to its center position due to the beveled edges of the stylus arm centering ramp 107. The flexible pivot assembly (120 in FIG. 5) which operates in conjunction with the flexible connector 110 to enable the stylus arm 106 to track the record groove is shown in FIG. 14.

Figure 14:
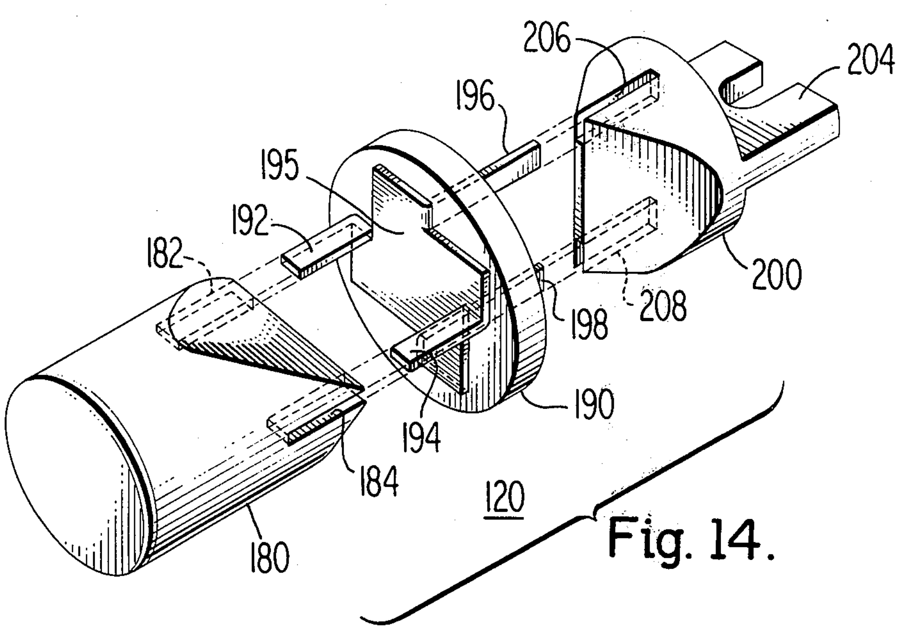
FIG. 14 is a detailed view of the pivot assembly shown in FIG. 10.

In FIG. 14 it is seen that the flexible pivot comprises an arm mount member 180, a spring mounting member 190 and a mounting bracket assembly 200. The arm mount 180 is attached to the stylus arm 106 and the mounting bracket assembly 200 has a mounting lug 204 which is attached to the groove velocity error corrector 125 (shown in FIG. 10) by means of a locking screw shown in FIG. 10. The arm mount assembly 180 includes slots 182 and 184 and the mounting bracket assembly 200 includes slots 206 and 208. A spring member 195 mounted in the spring mounting plate 190 has tab members 192 and 194 which fit into slots 182 and 184 respectively of the arm mount assembly 180; and tabs 196 and 198 which fit into slots 206 and 208 respectively of mounting assembly 200. It is noted that these tabs do not slide completely into the respective slots but allow a small clearance which forms leaf springs to allow horizontal and vertical motion. In the FIG. it is seen that spring tabs 192 and 194 allow vertical motion of the stylus arm 106 relative to the mounting bracket 200 and spring tabs 196 and 198 allow horizontal motion with respect to mounting bracket 200. This arrangement thereby allows relatively easy vertical and horizontal motion of the stylus arm while preventing rotational motion of the arm and, in addition, provides the necessary longitudinal strength (i.e., in the direction of the length of stylus arm 106) to allow the groove velocity error correction mechanism 125 to move the stylus arm assembly in the longitudinal direction. The flexible pivot 120 is described in greater detail in the previously noted Leedom application.

FIG. 15 is a circuit diagram, partically in block and partially in schematic form, of electrical circuitry which may be employed to process the capacitance variations detected between the electrode 23 and the metallized surface 11 of the recording medium 10 (of FIG. 1) to produce useful output signals. When the baseband recording system is employed to record information on the video disc, the circuit can be, for example, used to provide an amplitude modulated carrier signal which is applied to the antenna terminals of a television receiver for producing a television display. In the FIGURE, variable capacitor 300 represents the capacitance between the electrode 23 and the metallized surface 11 of the disc, which capacitance is varied by the signal elements recorded in the disc. The series capacitor 305 shown in dashed lines, represents the capacitance between the metallized layer 11 and ground. The electrode 23 is coupled to an inductor 245 by means of the electrical conductor 110 (also shown in FIG. 5). Inductor 245 has a tap terminal 249 to which is coupled a peak detector circuit 255 comprising a diode 256 and the parallel combination of a resistor 257 and a capacitor 258 coupled to a terminal on the diode remote from its connection to inductor 245, to ground. Capacitor 258, shown as a lumped parameter in the FIGURE, may, in an actual circuit, simply comprise the sum of the stray capacitance of the leads and the input capacitance of the pre-amplifier 260. A second tap terminal 247 on inductor 245 is coupled to ground. An RF oscillator 250 applied radio frequency signals to inductor 245. A preamplifier 260 is coupled to the peak detector circuit 255 and provides amplified signals at its output. Circuit elements 245, 255 and 260 can be mounted in the shield enclosure 104 to reduce the stray reactances by placing the components in proximity with the pickup electrode. This is illustrated in the FIGURE by the dashed lines surrounding these circuit components. The output of pre-amplifier 260 is coupled to an amplifier 270 which further amplifies the detected signals. The output of amplifier 270 is coupled to AM modulator 280 and to a sync separator circuit 290. The output of the sync separator circuit 290 is coupled to a discriminator circuit 310. The output of the discriminator circuit 310 is coupled to an amplifier 315 which is coupled to the groove velocity correction circuit 125 shown in FIG. 5. An oscillator circuit 320 produces a carrier signal which is applied to the AM modulator 280, and is modulated by the signal information from amplifier 270. The amplitude modulated carrier from modulator circuit 280 which appears at an output terminal A, can then be applied to the antenna terminals of a television receiver, for example, or to a cable television network.

In operation, the RF oscillator 250 provides an excitation voltage to a resonant circuit which comprises the capacitor 300, capacitor 305, the inductor 245, the junction capacitance of diode 256 and the stray capacitance 258. The inductor segment between the RF oscillator 250 and terminal 247 operates as an autotransformer primary, coupling the RF excitation signal to the resonant circuit. As the resonant frequency of the circuit is varied due to variations of capacitance 300, the amplitude of the excitation voltage at input of the diode varies. The resonant circuit Q and the excitation voltage level are chosen to provide a steep voltage vs. frequency characteristic at tap 249 so as to yield a signal detected by peak detector 255 of sufficient magnitude. The Q must be chosen, however, such that the resonant circuit simultaneously provides adequate bandwidth. The frequency of oscillator 250 is chosen such that it falls on one side of the frequency response curve of the resonant circuit and as the frequency of the resonant circuit changes due to signal information, will remain on that slope of the shifting frequency response of the resonant circuit during all signal conditions. Thus, as the electrode 23 tracks groove 14, capacitance 300 varies in accordance with the recorded information. The varying capacitance shifts the resonant frequency of the tuned circuit which includes capacitance 300. Since a constant frequency bias signal (from oscillator 250) is being applied to the circuit, as the resonant frequency varies, the response of the circuit to the bias frequency changes as a function of the recorded information, thereby providing an amplitude varying output signal at terminal 249. Peak detector 255 detects these amplitude variations by means of diode 256 and the filter network comprising resistor 257 and capacitor 258 removes the frequency components above the signal information. In one embodiment, inductor 245 was fabricated from 15 turns of No. 30 (A.S.W.G.) copper wire, tightly wound on a ⅛ inch diameter mandrel. Tap 249 was 5 turns from the connection of inductor 245 to conductor 110. Tap 247 was eight turns down from tap 249 and the oscillator 250 was coupled to inductor 245 two turns down from tap 247. Diode 256 was a Hewlett Packard Associates type 2,900 and resistor 257 was 10 kilohms. The capacitance 258 had a reactive impedance of 5 kilohms at a frequency of 4MHz.

The signals from detector 255 are coupled to preamplifier 260 which can also be mounted in the shield enclosure 104 to reduce noise interference with the signal. The output signal from amplifier 260 is then applied to a second amplifier 270 for further amplification. In an illustrative embodiment, amplifier 260 has a voltage gain of ten, while amplifier 270 has a voltage gain of 100. Output signals from amplifier 270 can be employed to drive whatever system the signals are recorded for. For example, if used for audio frequencies, signals from amplifier 270 can be applied to a power amplifier for driving sound transducers. When utilized for audio frequency recording, the turntable rotational speed can, of course, be greatly reduced to increase the playing time.

In the embodiment shown in FIG. 15, the system is employed for the recording and playback of baseband recorded NTSC television signals including synchronization signals. Thus, the output signal of amplifier 270 will include video frequency signals as well as vertical and horizontal synchronization signals. A sync separator circuit 290 separates the horizontal synchronization pulses from the composite signal and couples them to a discriminator circuit 310. The discriminator is designed to provide a control voltage when the synchronization signals from separator 290 vary from the nominal 15.7 KHz rate due to groove velocity changes. Thus, it is seen that the synchronization signal frequency provides a pilot tone recorded on the disc which can be detected by discriminator 310 to provide a control voltage when the recorded sync signal frequency deviates from its proper value due to disc velocity errors. The control signal from discriminator 310 is applied to the mechanism 125 of FIG. 5 by means of amplifier 315 to provide a corrective longitudinal motion to the stylus arm 106 in a direction to tend to cancel the groove velocity error. The operation of this groove velocity corrector and detector circuit is explained in greater detail in the Palmer application previously mentioned. The composite signal from amplifier 270 can also be applied to an amplitude modulator circuit 280 if it is desired to couple the video signals to the antenna terminals of a television receiver. Oscillator 320 has a frequency chosen to coincide with one of the UHF or VHF channels of a television receiver and supplies a carrier wave to the modulator which is amplitude modulated by the video and synchronization signals from amplifier 270. Modulator 280 includes video clamp circuitry for clamping the video level at a predetermined value. The amplitude modulated signal from stage 280 can then be coupled directly to the antenna terminals of a standard television receiver which serves as the display device for video signals recorded on the video disc 100 of FIG. 10.

The circuitry described is used when baseband signals are recorded on the video disc. When AM carrier signals (such as shown in FIG. 6) are recorded, the AM modulator 280 of FIG. 15 would be replaced by a mixer circuit to shift the frequency of the detected AM carrier signal to one of the television channels. Also a peak detector circuit is inserted prior to the sync separator to provide detected composite video signals from the modulated carrier signals.

Likewise, a circuit modification is necessary when the FM recording system illustrated in FIG. 7 is employed to record signals on the disc. In such case, an FM detector circuit must be inserted into the circuit of FIG. 15 immediately after the amplifier 270 (i.e., between amplifier 270 and the AM modulator 280 and sync separator 290). It is noted that with all of the various recording schemes, the front end of the pickup circuit (i.e., those components in block 104, the RF oscillator 250, and the signal and stray capacitances 300 and 305 respectively) is identical and only small circuit modifications are necessary when switching from one recording format to another.

What is claimed is:

1. A disc record having a spiral groove in a surface thereof;

said spiral groove containing an information track in the bottom of said groove including (1) first recurring regions regularly spaced along the length of the successive convolutions of the spiral, in each of which at least a portion of the groove bottom area is depressed to a maximum depth, with the remainder, if any, of the groove bottom area in each first region raised relative to said maximum depth, and (2) second regions, separating said first regions, in each of which at least a portion of the groove bottom area is raised relative to said maximum depth, with the remainder, if any, of the groove bottom area in each second region depressed to said maximum depth;

the percentage of groove bottom area in each first region which is subject to depression to said maximum depth varying in accordance with recorded information, with the percentage of groove bottom area in an adjoining second region which is subject to depression to said maximum depth varying complementarily so that the percentage of groove bottom area raised relative to said maximum depth in successive pairs of first and second regions remains substantially constant and independent of recorded information;

wherein the groove bottom portion which is depressed to said maximum depth in each of said first recurring regions is centrally located relative to the sides of said groove;

wherein the groove bottom portion which is raised relative to said maximum depth in each of said second recurring regions is centrally located relative to the sides of said groove;

wherein said spiral groove has respective sidewalls of substantially invariant geometry throughout successive convolutions of the spiral;

wherein the groove cross-section in each of said first recurring regions has a shape such that the surfaces of the respective groove sidewalls and said raised remainder of the groove bottom area define respective sections of a continuous smooth curve; and wherein the groove cross-section in each of said second recurring regions has a shape such that the surfaces of the respective groove sidewalls and said centrally located, raised groove bottom portion define respective sections of a continuous smooth curve.

2. A disc record having a spiral groove in a surface thereof;

said spiral groove having respective curved sidewalls of substantially invariant geometry throughout successive convolutions of the spiral;

the groove cross-section alternating along said groove between a first recurring shape in which the curved surfaces of the respective groove sidewalls and the intervening groove bottom define a continuous smooth curve and a second recurring shape in which the surface of said intervening groove bottom is depressed relative to the groove bottom level associated with the definition of said continuous smooth curve for said first shape;

the frequency of occurrence of the alternations of the groove cross-section between said first shape and said second shape along the length of said spiral groove varying in accordance with recorded information.

* * * * *